United States Patent
Duerr et al.

(10) Patent No.: US 6,921,233 B2
(45) Date of Patent: Jul. 26, 2005

(54) CUTTER INSERT AND MILLING TOOL

(75) Inventors: Hans-Peter Duerr, Gomaringen (DE); Thorsten Stabel, Moessingen (DE)

(73) Assignee: Walter AG, Tubingen (DE)

( * ) Notice: Subject to any disclaimer, the term of this patent is extended or adjusted under 35 U.S.C. 154(b) by 0 days.

(21) Appl. No.: 10/790,235

(22) Filed: Mar. 2, 2004

(65) Prior Publication Data

US 2004/0208713 A1 Oct. 21, 2004

(30) Foreign Application Priority Data

Mar. 22, 2003 (DE) .......................................... 103 12 922

(51) Int. Cl.[7] .............................................. B23B 27/16
(52) U.S. Cl. ........................................ 407/34; 407/113
(58) Field of Search ................................. 407/113, 114, 407/115, 116, 103, 34

(56) References Cited

U.S. PATENT DOCUMENTS

| | | |
|---|---|---|
| 3,490,117 A | 1/1970 | Hertel |
| 4,074,949 A | 2/1978 | Hochmuth et al. |
| 4,699,549 A | 10/1987 | Shimomura et al. |
| 5,071,291 A * | 12/1991 | Kaminski ..................... 407/30 |
| 6,293,737 B1 * | 9/2001 | Satran et al. ................ 407/113 |
| 6,648,560 B2 * | 11/2003 | Andras ........................ 407/109 |

FOREIGN PATENT DOCUMENTS

| | | |
|---|---|---|
| EP | 0 868 957 | 10/1998 |
| WO | WO 02/102536 | 12/2002 |

* cited by examiner

*Primary Examiner*—Willmon Fridie, Jr.
(74) *Attorney, Agent, or Firm*—Burns, Doane, Swecker & Mathis, LLP

(57) ABSTRACT

A cutter insert for milling tools includes a base body having a base surface, a top surface, and four side surfaces. The four side surfaces, together with each of the base surface and the top surface, define respective cutting edges. The base body is twisted about each of two perpendicular, coplanar axes of the base body. Each side surface has two opposite corner edges that are offset from one another in a direction parallel to a center axis of the base body.

22 Claims, 5 Drawing Sheets

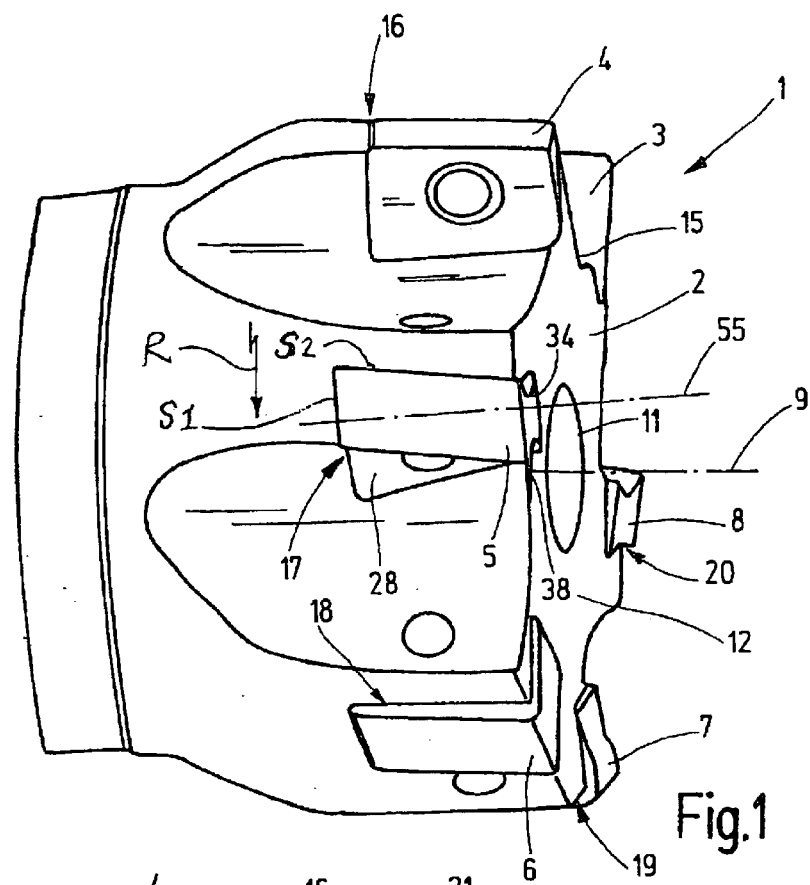
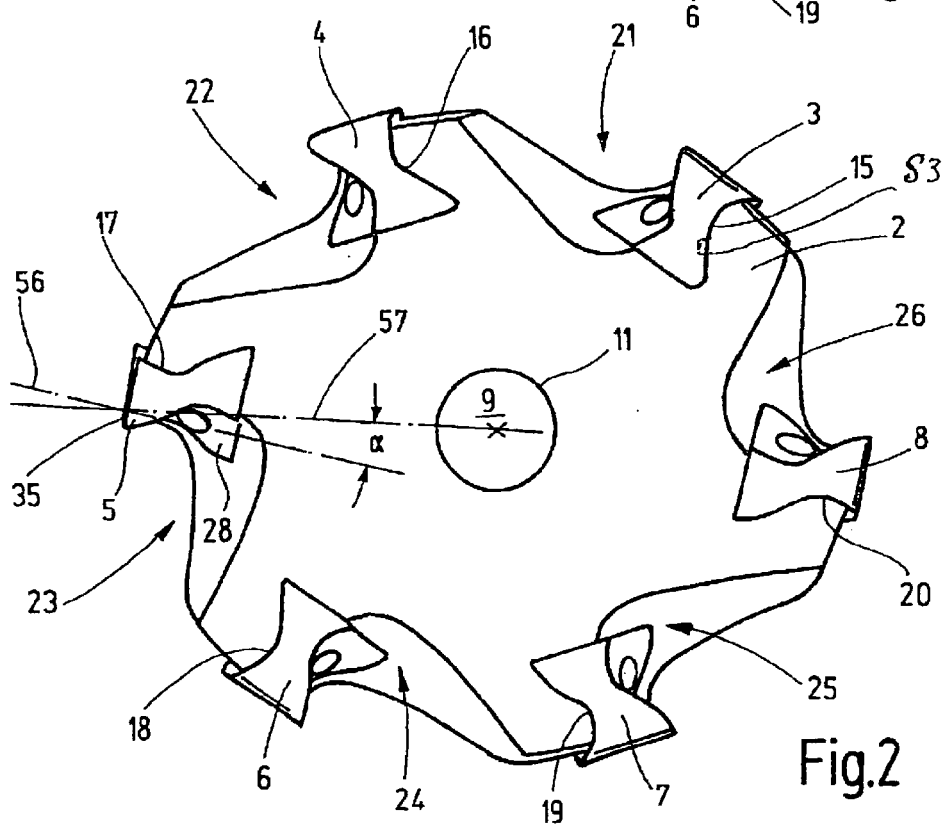
Fig.1
Fig.2

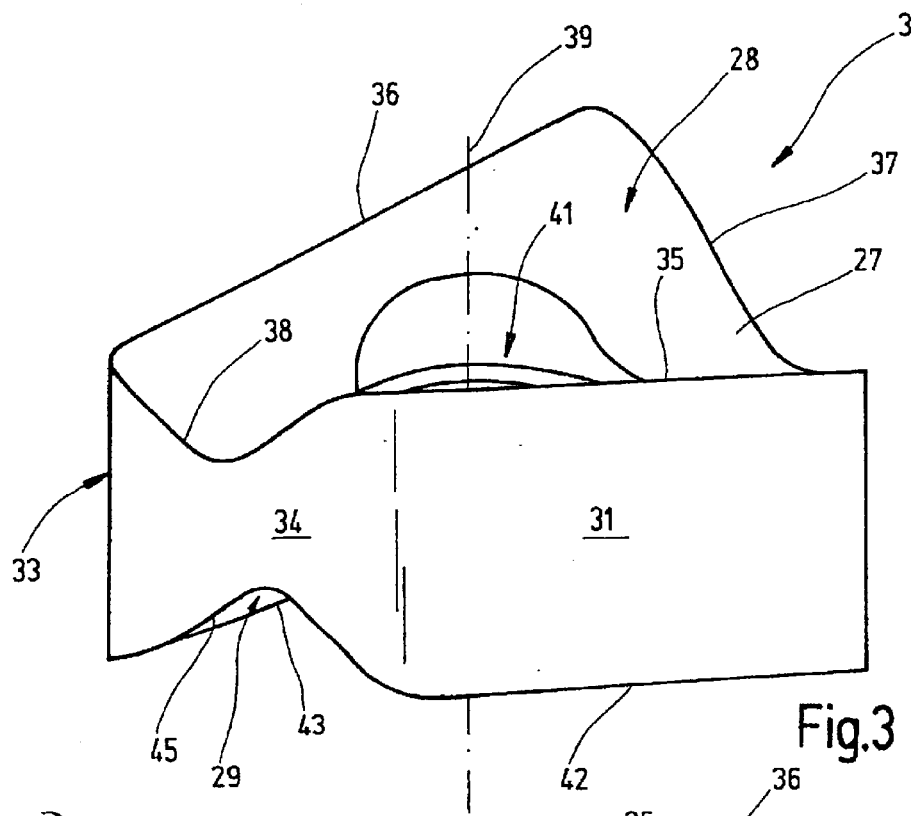
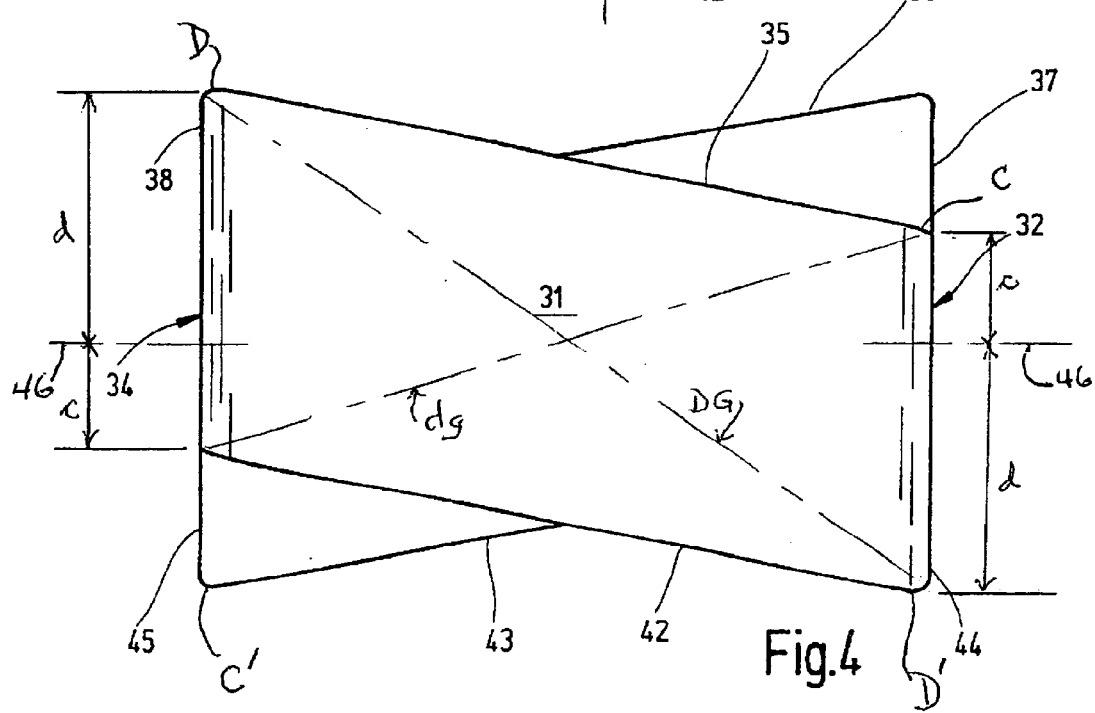

CUTTER INSERT AND MILLING TOOL

This application claims priority under 35 U.S.C. §§ 119 and/or 365 to patent application Serial No. 10312922.7 filed in Germany on Mar. 22, 2003 the entire content of which is hereby incorporated by reference.

BACKGROUND OF THE INVENTION

The invention relates to a cutter insert for milling tools, particularly corner milling cutters, as well as a milling tool provided with such a cutter insert.

As a rule, milling tools are provided with cutter inserts which may be secured in their respective insert seat in several orientations. In this manner several cutting edges provided on the cutter insert may become active in succession, whereby the service life of the cutter insert is extended. The geometrical configuration of a cutter insert significantly affects the chip formation. For example, in most cases a positive rake angle is desired, both at the peripheral cutting edges and at the frontal cutting edges of a milling tool. As a rule, these desiderata are taken into account in the shaping of the cutter insert. "Positive cutter inserts" have at their cutting edges wedge angles which are significantly less than 90°. Such a result is achieved by ensuring a suitable inclination of the side surfaces (free surfaces) and the top surface (rake surface).

Such cutter inserts are described, for example, in German patent document DE 36 18 574 A1 corresponding to U.S. Pat. No. 4,699,549. The rake surface of such a cutter insert, as illustrated, for example, in FIGS. 42, 55 and 56 of that document, differs from the shape of a simple plane. The rake surface is formed of two partial surfaces which slope downward toward a diagonal intersecting the securing opening. The base surface of such cutter inserts is planar. The insert seat of the tool body accordingly has a planar conforming engagement surface.

Reversible cutter inserts of the above-outlined conventional construction may be secured in two different orientations in their respective insert seat. The positions of the insert differ from one another by a rotation through 180° about an imaginary axis passing coaxially through the securing opening. In case the cutting edges accessible in either positions have become worn, the cutter insert must be replaced as a whole.

It is accordingly the object of the invention to provide a cutter insert and a milling tool therefor, wherein the cutter insert has an improved useful life.

SUMMARY OF THE INVENTION

This object is achieved by a cutter insert and by a milling tool which includes a plurality of the cutter inserts. The cutter insert comprises a base body having a base surface, a top surface, and four side surfaces which, together with each of the base surface and the top surface, define respective cutting edges. The base body is twisted about two separate axes of the base body.

Preferably, the two axes lie in a common plane which is intersected at a right angle by a securing bore which extends from the base surface to the tope surface for receiving a threaded fastener. Preferably, the two axes intersect one another at a right angle.

The cutter insert according to the invention has a base body which is twisted in two directions, that is, it has a double twist. Thus, the cutter insert has no longer a planar base surface, but a base surface which is of the same shape as the top surface. In case the cutter insert is turned, for example, about a longitudinal axis or a transverse axis, so that the base surface arrives in a position which was previously assumed by the top surface, then the top surface is identical in all essential aspects to the base surface that has occupied the same position previously, and vice versa. The reversible cutter insert is thus rotationally symmetrical with respect to at least one symmetry axis passing transversely through the securing opening. In this manner the reversible cutter insert may be turned at its location not only through 180° about an axis which passes coaxially through the securing opening (and which is also a symmetry axis), but additionally about at least one symmetry axis oriented transversely to the securing opening. As a result, instead of only two cutting edges or cutting edge pairs that have been accessible heretofore, a total of four are now accessible which doubles the service life of the inventive cutter insert as compared to conventional cutter inserts.

The reversibility of reversible simple rectangular cutter inserts having a cuboid base shape is known. Such simple cutter inserts, however, cannot be readily used in corner milling cutters, particularly in case positive rake angles are required. The cutter insert according to the invention, however, makes such a use possible by virtue of its double-twisted structure. The two symmetry axes preferably lie in a central plane to which the securing opening is essentially perpendicular. Further, the symmetry axes pass through the side surfaces which may be, for example, planar. In such a case they form a right angle with the central plane, so that overall a cutter insert with a negative base shape is obtained. The negative base shape is relatively simple to manufacture by resorting to the technology of powder metallurgy. In particular, no molds with movable mold parts are needed for making the compressed powder blank. The special twist of the base surface and the top surface which serve as rake surfaces makes it readily possible to obtain a positive rake angle for the cutter insert of overall negative base shape in all four possible installed positions. Positive free angles are obtained by a correspondingly negatively inclined installed position of the cutter inserts in the tool body.

While the side surfaces are preferably planar, it is also feasible to give them a faceted or a convexly arcuate configuration. The double-sided cutter insert then has a positive rake surface geometry and negative free surface geometries all around. Further, the cutting edges which are intended to function as peripheral cutting edges, may be either straight or slightly bulging, for example, elliptically curved. Such curvature is preferably so designed that the cutting edges define a cylinder surface in the installed position. Such a milling tool produces planar surfaces with its peripheral cutting edges.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIG. 1 is a perspective side view of a milling tool according to the invention,

FIG. 2 is a front elevational view of the milling tool according to FIG. 1,

FIG. 3 is a perspective view of a cutter insert of the milling tool according to FIG. 1 or 2, shown on a different scale, FIG. 4 is a side elevational view of the cutter insert according to FIG. 3.

DESCRIPTION OF PREFERRED EMBODIMENTS OF THE INVENTION

Figure 5:
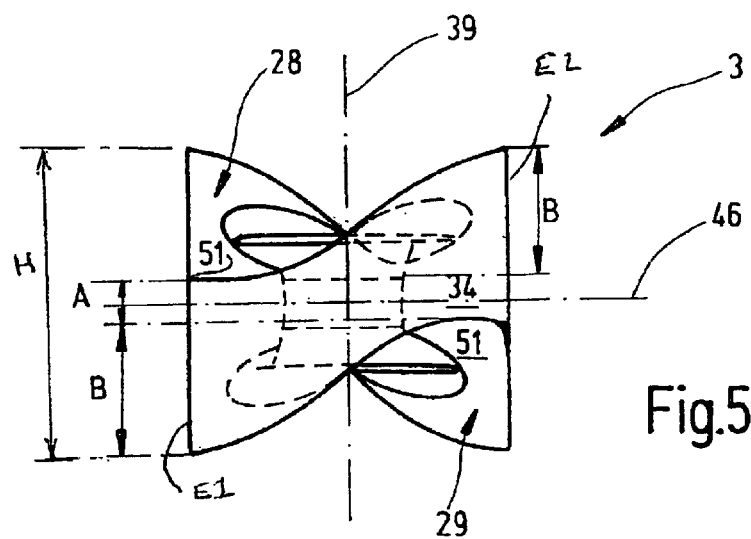
FIG. 5 is a front elevational view of the cutter insert according to FIG. 3.

FIG. 1 shows a milling tool 1 comprising a tool body 2 and cutter inserts 3, 4, 5, 6, 7, 8 secured thereto. The cutter inserts 3 to 8 are of identical construction, and consequently, the ensuing description of the cutter insert 3 applies to all the other cutter inserts 4 through 8.

The tool body 2 is designed for rotation in a direction R about a rotary axis 9 and has a securing opening 11 which is concentric to the rotary axis 9. The milling tool 1 is corner milling cutter; its cutter inserts 3 to 8 have active cutting edges both on the end face 12 and along the periphery of the milling tool 1. The cutter inserts 3 to 8 are disposed in respective insert seats 15 to 20 provided in respective pockets 21 to 26 of the tool body 2, as particularly well seen in FIG. 2.

In the description which follows, the structure of the cutter insert 3 will be explained in conjunction with FIGS. 3 to 7. The cutter insert 3 has a base body which, as observed in the top plan view of FIG. 7, has a rectangular or rhomboid shape. The base body is bounded by a top surface 28 at the top and by a base surface 29 at the bottom. The base surface 29 and the top surface 28 are laterally connected to one another by preferably planar side surfaces 31, 32, 33, 34 which, together with the top surface 28, define two peripheral cutting edges 35, 36 and two frontal cutting edges 37, 38. The peripheral cutting edges 35, 36 are preferably straight; if required, however, they may be slightly arcuate as will be explained in connection with FIG. 8. The peripheral cutting edges 35, 36 constitute main cutting edges, while the frontal cutting edges 37, 38 constitute secondary cutting edges.

The peripheral cutting edge 36 and the frontal cutting edge 37 form a first cutting edge pair; the peripheral cutting edge 35 and the frontal cutting edge 38 form a second cutting edge pair. Thus, with the top surface 28 two cutting edge pairs are associated which correspond to two respective working positions of the cutter insert 3. The working positions differ from one another by a rotation of the cutter insert through 180° about a center axis 39 of the insert (FIG. 3), which axis 39 also constitutes a bore axis in cases where the insert is provided with a securing bore 41 centrally traversing the base body 27 for receiving a threaded fastener. In this manner, the bore axis 39 constitutes an axis of symmetry for the cutter insert 3 with respect to the shape of the top surface 28 and the side surfaces 31, 32, 33, 34.

The cutter insert is likewise of symmetrical construction with respect to the base surface 29. The base surface 29 is bounded by cutting edges 42, 43, 44, 45 which the base surface 29 defines together with the side surface 31, 32, 33, 34. The cutting edges 42, 43 are peripheral cutting edges, while the cutting edges 44, 45 are frontal cutting edges.

It will thus be appreciated that each of the side surfaces includes four corners C, C', D, D', including a first pair of diagonally opposite corners C, C' and a second pair of diagonally opposite corners D, D'. The first pair of corners C, C' are spaced by equal first distances c from the center plane 46, and the second pair of corners D, D' are spaced by equal second distances d from the center plane. The second distances d are longer than the first distances c whereby each side surface defines a short diagonal dg extending between the first pair of corners, and a long diagonal DG extending between the second pair of corners. The long diagonal of each side is non-parallel to the long diagonal (shown in phantom lines in FIG. 4) of an opposite side surface.

Figure 6:
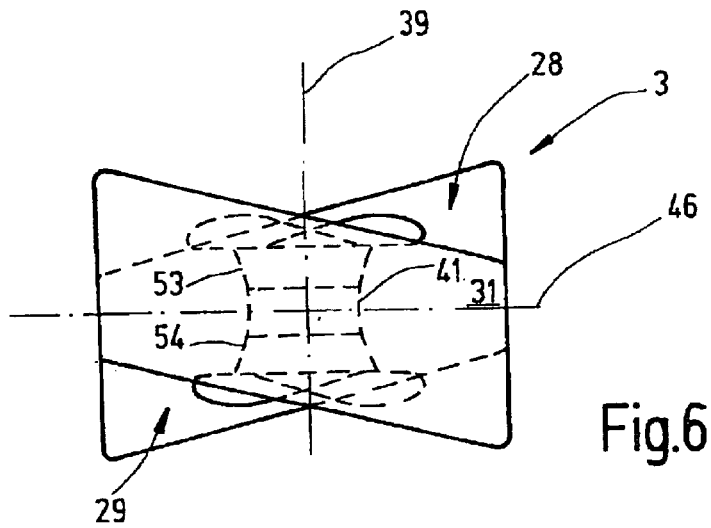
FIG. 6 is a modified side elevational view of the cutter insert according to FIG. 3.

The cutting edges 35 to 38 and 42 to 45 are each arranged obliquely to a central plane 46 which is shown in FIGS. 5 and 6 and which is perpendicular to the drawing plane of these figures. The bore axis 39 is essentially perpendicular to the central plane 46. Further, the central plane 46 passes through the center of gravity of the base body 27 and defines two additional (first and second) symmetry axes 47, 48 which are coplanar and oriented perpendicularly to the bore axis 39. The first symmetry axis 47 extends parallel to the mutually parallel side surfaces 31, 33 and the second symmetry axis 48 extends parallel to the mutually parallel side surfaces 32, 34. This relationship applies in case of a rectangular top elevational view (FIG. 7) and in case of cutter inserts having a rhomboid base shape. In the former case the symmetry axes 47, 48 are perpendicular to one another, while in the latter case they define an acute angle whose magnitude is identical with that of the acute corner angle.

The symmetry axes 47, 48 are reversing axes about which the cutter insert 3 may be selectively turned when indexing the insert. The base body 27 is twisted about both symmetry axes 47, 48. That is, the side surfaces 32 and 34 are configured as twisted relative to one another about the axis 47, and the side surfaces 31 and 33 are configured as being twisted relative to one another about the axis 48. Accordingly, the top surface 28 slopes downward toward the securing bore 41 from the elevated corner defined between the frontal cutting edge 37 and the peripheral cutting edge 36. The top surface 28 also slopes downward toward the securing bore 41 from the other elevated corner defined between peripheral cutting edge 35 and the frontal cutting edge 38. The top surface 28 thus has a diagonally extending trough or depression 51. The corresponding depression 52 of the base surface, in turn, extends in the direction of the other diagonal of the base shape which is rectangular in top plan view (see FIG. 7).

The securing bore 41 has at its opposite open ends respective conical seating surfaces 53, 54 arranged concentrically to the bore axis 39. The insert seats 15 to 20 are each provided with two planar engagement surfaces S1, S2 for abutting the side surfaces of each cutter insert 3 to 8. The two planar engagement surfaces adjoin a respective pocket 21 to 26. The insert seats 15 to 20 are further provided with a supporting surface S3 whose shape corresponds to the base surface 29 and thus also to the top surface 28 of the respective insert. The insert seats are of identical structure; they set the cutter inserts 3 to 8 negatively with respect to the radial direction and negatively with respect to the axial direction. FIG. 1 illustrates the position of the central plane 46 with respect to the rotary axis 9. A line 55 shown in FIG. 1 is perpendicular to the front-side side surface 34 of the cutter insert 5 and thus indicates the inclination of the central plane 46 not shown in FIG. 1. As may be observed, the line 55 defines an acute angle with the line 9 when projected into the common drawing plane, and thus the side surface 34 defines a positive free angle. By virtue of the marked twist of the base body 27, the top surface 28 extending away from the frontal cutting edge 38 slopes downward to such a significant extent that at the front side a positive axis angle (rake angle) is obtained despite the negative setting of the cutter insert 5.

Figure 7:
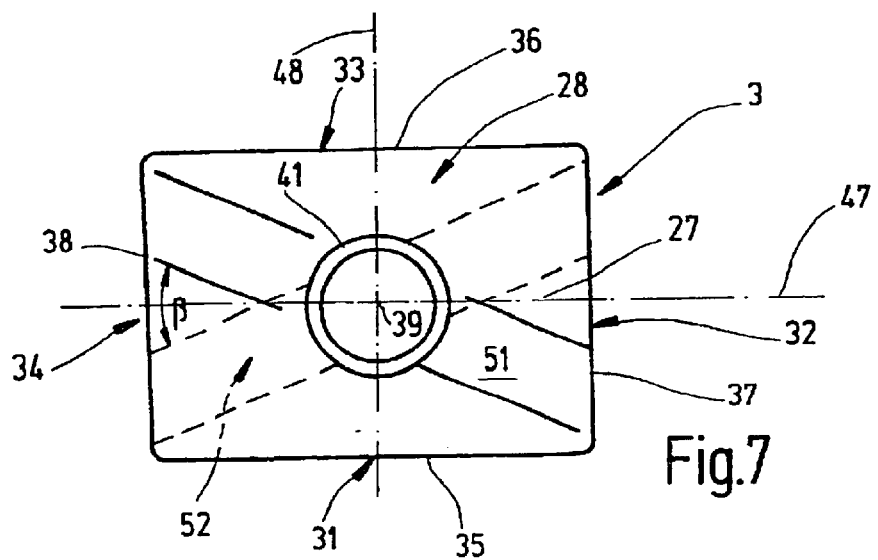
FIG. 7 is a top plan view of the cutter insert according to FIG. 6.

The same considerations apply to the other cutter inserts. Reference is made to FIG. 2 as concerns the radial setting. A line 56 which extends parallel to the central plane 46 and which intersects the trailing corner of the peripheral cutting edge 35 of the cutter insert 5, forms with the radial direction 57 an acute angle ∝ which is considered to be a negative angle in this instance, resulting in a positive free angle. A positive rake angle is obtained by the steep downward slope of the top surface 28 away from the peripheral cutting edge 35. By a steep downward slope it is meant that at the cutting edge 35 the top surface 28 forms with the side surface 31 an angle which is substantially less than 90°. Stated differently, the cutter insert 3 according to the invention has side surfaces 31, 32, 33, 34 which are perpendicular to the central plane 46 and which have a wedge angle less than 90° at all the cutting edges 35, 36, 37, 38 and, respectively, 42, 43, 44, 45. Further, the rake surfaces, that is, the top surface 28 and the base surface 29, slope downward toward respective diagonals which differ from one another as shown in FIG. 7.

Figure 8:
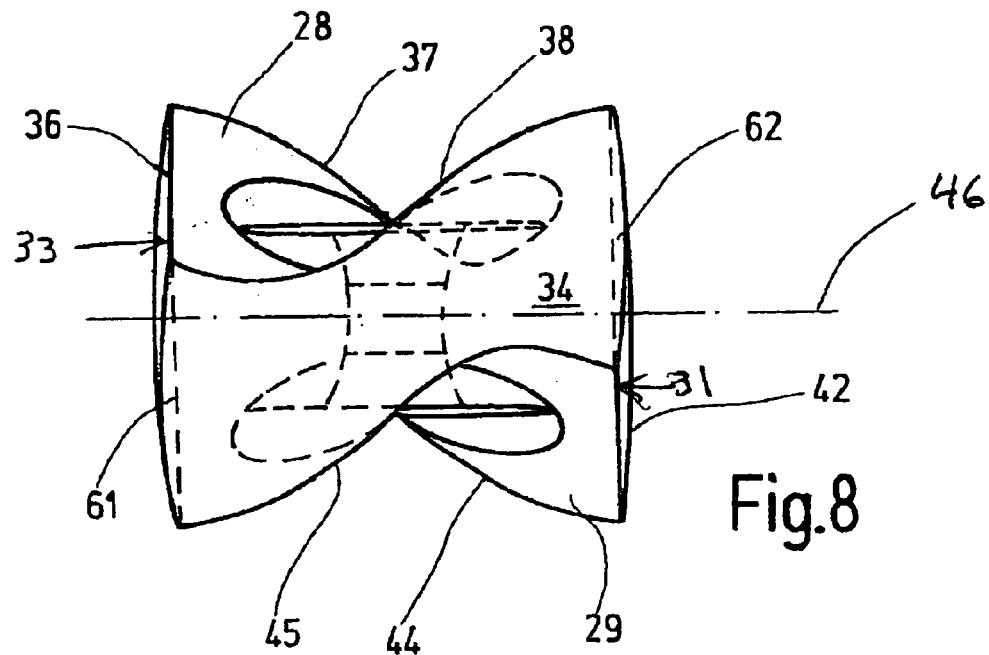
FIG. 8 is a front elevational view of a modified embodiment of a cutter insert according to the invention.
Figure 9:
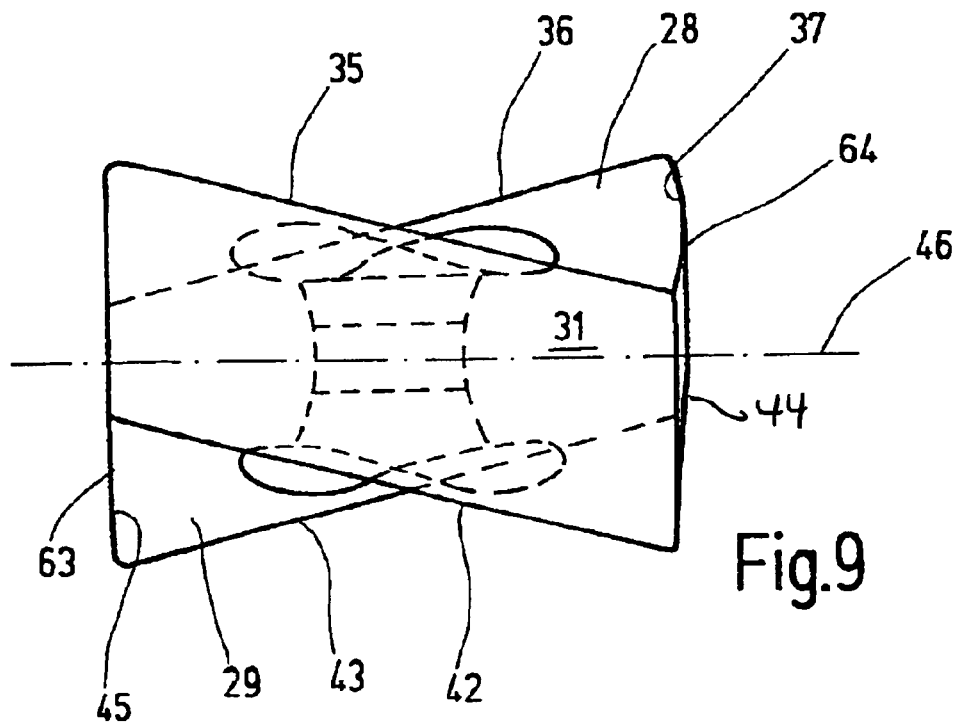
FIG. 9 is a side elevational view of the cutter insert according to FIG. 8.

FIGS. 8 and 9 show a modified embodiment of the cutter insert 3. The modified embodiment differs from the earlier-described cutter insert only in that the side surfaces 31, 32, 33, 34 are convexly arcuate. The side surfaces are arcuate over a respective (beyond) imaginary reference line 61, 62, 63, 64. Each of the lines 61–64 interconnects two cutting edges which border one and the same side surface 31, 32, 33, 34. For example, the line 61 interconnects the cutting edges 36 and 43 which border the side surface 33. The lines 61 to 64 are perpendicular to the central plane 46. In other aspects the earlier description applies.

Figure 10:
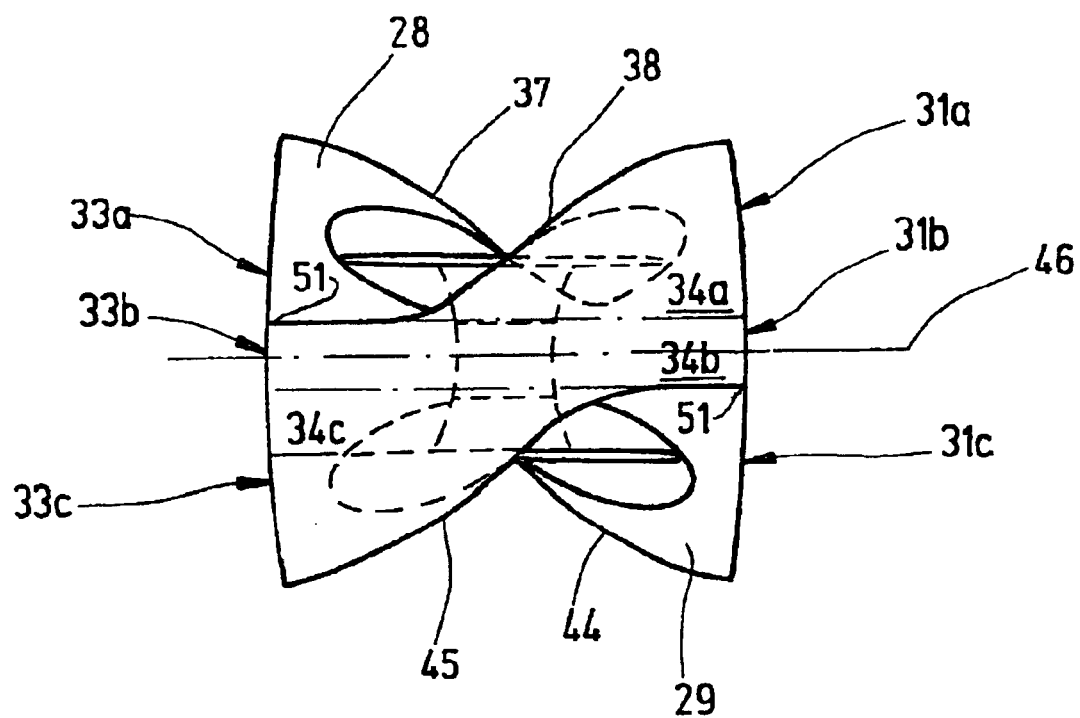
FIG. 10 is a front elevational view of an embodiment of a cutter insert according to the invention.

Instead of being convexly curved, the side surfaces may be convexly faceted as shown in FIG. 10. This applies to all four side surfaces of the cutter insert 3. The side surface facets are designated with the letter indices a, b, c. The facets indexed at b are perpendicular to the central plane 46 and enclose a cuboid-shaped central region.

Referring to FIG. 5, it can be seen that each side surface includes two opposite corner edges E1, E2 each corner edge extending from the top surface 28 to the base surface 29 parallel to the center axis 39. Due to the double-axis twisted configuration of the insert, those two corner edges are offset from one another by a distance B in a direction parallel to the center axis, as shown in FIG. 5. The insert also defines a total height or thickness H, wherein the following relationship applies:

$$H-2B=A$$

wherein A constitutes a central region of the insert's height. As is shown, A is shorter than B. Thus, the thickness A of the central region is less (preferably significantly less) than the height B of the elevation with which the upper and lower corners project beyond the central region. This expresses the substantial twist of the cutter insert 3. The central region is bordered from above and from below by the troughs or depressions 51, 52 which lie in mutually parallel planes. The cutter inserts 3 shown in FIGS. 6 to 9 have likewise a corresponding geometry.

A cutter insert 3, particularly intended for use as a corner milling cutter (milling tool 1), includes, as viewed in top plan view, a quadrilateral (for example, rectangular or rhomboid) base body. The preferably planar side surfaces 31 to 34 of the base body are parallel to a bore axis 39 of its securing bore 41 and/or perpendicular to a central plane 46 passing through the center of gravity of the base body 27. The base surface 29 and the top surface 28 are of identical shape and are rotationally symmetrical to one another and slope downward toward a trough extending obliquely in the base surface 29 and the top surface 28, respectively. The troughs intersect one another at an acute angle β. The peripheral cutting edges 35, 42, 36, 43 which pairwise border the same side surfaces 31 and 33, respectively, are preferably straight and are arranged parallel to one another. A reversible cutter insert is obtained which may be used in four different installed orientations and thus has four different cutting edges or cutting edge pairs. The cutter insert 3 has an overall negative base shape, resulting in all installed positions in a positive axial rake angle and a positive radial rake angle.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. Cutter insert for milling tools comprising:
    a four-cornered base body having a non-planar base surface, a non-planar top surface and four side surfaces, including first and second pairs of opposite side surfaces,
        the side surfaces, together with the top surface forming two sets of cutting edges which converge at respective diagonally opposite corners,
        the side surfaces, together with the bottom surface, forming two sets of cutting edges which converge at respective diagonally opposite corners,
    a securing bore extending through the base surface and the top surface,
    the base body being configured as twisted around first and second axes of symmetry lying in a common plane which is intersected by a center axis of the securing bore at a right angle, the first axis of symmetry passing through the first pair of opposite sides which are configured as twisted relative to one another about the first axis of symmetry, the second axis of symmetry passing through the second pair of opposite sides which are configured as twisted relative to one another about the second axis, wherein the base surface and the top surface are of identical shape and are rotationally symmetrical to one another.

2. The cutter insert as defined in claim 1, characterized in that each side surface is bordered by a pair of cutting edges, one of which adjoins the top surface and the other of which adjoins the base surface, each pair of cutting edges being interconnected by an imaginary reference line which perpendicularly intersects a central plane of the base body situated midway between the top surface and the base surface.

3. The cutter insert as defined in claim 1, characterized in that the side surfaces are convex.

4. The cutter insert according to claim 1 wherein the center axis extends through the top surface and the base surface, the base body having a total height H parallel to the center axis, each side surface including two opposite corner edges, each corner edge extending from the top surface to the base surface, the two corner edges of each side surface being offset from one another by a first distance a direction parallel to the center axis, wherein H−2B=A and A<B.

5. The cutter insert as defined in claim 1, characterized in that the side surfaces are oriented perpendicularly to a central plane of the base body disposed midway between the top surface and the base surface.

6. The cutter insert as defined in claim 1, characterized in that the side surfaces are planar.

7. The cutter insert as defined in claim 1, characterized in that the securing bore has respective seating surfaces at the top surface and the base surface for receiving a head of a threaded fastener.

8. The cutter insert as defined in claim 7, characterized in that the seating surfaces are conical.

9. The cutter insert as defined in claim 7, characterized in that the seating surfaces are conical.

10. The cutter insert as defined in claim 1, characterized in that at least two of the side surfaces are rhomboid.

11. A milling tool comprising a tool body and a plurality of cutter inserts, the tool body defining an axis of rotation and having a plurality of insert seats spaced around the axis of rotation of receiving respective cutter inserts, each cutter insert comprising:
   a four-cornered base body having a non-planar base surface, a non-planar top surface and four side surfaces, including first and second pairs of opposite side surfaces,
      the side surfaces, together with the top surface forming two sets of cutting edges which converge at respective diagonally opposite corners,
      the side surfaces, together with the bottom surface, forming two sets of cutting edges which converge at respective diagonally opposite corners,
   a securing bore extending through the base surface and the top surface,
   the base body being configured as twisted around first and second axes of symmetry lying in a common plane which is intersected by a center axis of the securing bore at a right angle, the first axis of symmetry passing through the first pair of opposite sides which are configured as twisted relative to one another about the first axis of symmetry, the second axis of symmetry passing through the second pair of opposite sides which are configured as twisted relative to one another about the second axis, wherein the base surface and the top surface are of identical shape and are rotationally symmetrical to one another.

12. The milling tool as defined in claim 11, characterized in that each insert seat has seating surfaces at which the respective cutter insert is set negatively in a radial direction with respect to an imaginary line which extends parallel to a central plane of the base body situated midway between the top surface and the base surface, the imaginary line touching a peripheral cutting edge at its trailing corner.

13. The milling tool as defined in claim 11, characterized in that each insert seat has seating surfaces at which the respective cutter insert is set negatively in an axial direction with respect to an imaginary line which is parallel to a central plane of the base body situated midway between the top surface and the base surface.

14. A cutter insert for milling tools, the insert comprising a base body having a base surface, a top surface, and four side surfaces which, together with each of the base surface and the top surface, define respective cutting edges at the top and base surfaces; the body defining a center plane disposed midway between the top and base surfaces; each of the side surfaces including four corners including a first pair of diagonally opposed corners and a second pair of diagonally opposed corners, the first pair of corners spaced by equal first distances from the center plane, and the second pair of corners spaced by equal second distances from the center plane, wherein the second distances are longer than the first distances; each side surface defining a first diagonal extending between the first pair of corners, and a second diagonal, longer than the first diagonal, extending between the second pair of corners, wherein the second diagonal of each side surface is non-parallel relative to the second diagonal of an opposite side surface.

15. The cutter insert as defined in claim 14, characterized in that the base body has a securing bore formed therethrough from the base surface to the top surface perpendicular to the center plane.

16. The cutter insert as defined in claim 14, characterized in that the side surfaces are convex.

17. The cutter insert as defined in claim 15, characterized in that the side surfaces are oriented perpendicularly to the central plane.

18. The cutter insert as defined in claim 14, characterized in that the side surfaces are planar.

19. A milling tool comprising a tool body and a plurality of cutter inserts, the tool body defining an axis of rotation and having a plurality of insert seats spaced around the axis of rotation for receiving respective cutter inserts, each cutter insert comprising a base body having a base surface, a top surface, and four side surfaces which, together with each of the base surface and the top surface, define respective cutting edges at the top and base surfaces; the body defining a center plane disposed midway between the top and base surfaces, each of the side surfaces including four corners including a firsts pair of diagonally opposed corners and a second pair of diagonally opposed corners, the first pair of corners spaced by equal first distances from the center plane, and the second pair of corners spaced by equal second distances from the center plane, wherein the second distances are longer than the first distances; each side surface defining a first diagonal extending between the first pair of corners, and a second diagonal longer than the first diagonal, extending between the second pair of corners, wherein the second diagonal of each side surface is non-parallel relative to the second diagonal of an opposite side surface.

20. The milling tool as defined in claim 19, characterized in that each insert seat has seating surfaces at which the respective cutter insert is set negatively in a radial direction with respect to an imaginary line which extends parallel to a central plane of the base body situated midway between the top surface and the base surface, the imaginary line touching a peripheral cutting edge at its trailing corner.

21. The milling tool as defined in claim 19, characterized in that each insert seat has seating surfaces at which the respective cutter insert is set negatively in an axial direction with respect to an imaginary line which is parallel to the central plane.

22. The cutter insert according to claim 19, wherein each side surface intersects the top edges that are parallel as the insert is viewed in a direction perpendicular to the side surface.

* * * * *